US011550983B2

(12) United States Patent
Lespinats

(10) Patent No.: US 11,550,983 B2
(45) Date of Patent: Jan. 10, 2023

(54) METHOD FOR DETERMINING AN ELECTRICAL MODEL OF A STRING OF PHOTOVOLTAIC MODULES, DIAGNOSTIC METHOD AND DEVICE ASSOCIATED THEREWITH

(71) Applicant: Commissariat à l'Energie Atomique et aux Energies Alternatives, Paris (FR)

(72) Inventor: Sylvain Lespinats, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 542 days.

(21) Appl. No.: 16/682,807

(22) Filed: Nov. 13, 2019

(65) Prior Publication Data
US 2020/0151379 A1 May 14, 2020

(30) Foreign Application Priority Data
Nov. 14, 2018 (FR) ...................................... 1860499

(51) Int. Cl.
*G06F 30/30* (2020.01)
*G06F 30/367* (2020.01)
*H02S 50/10* (2014.01)
*G06F 30/38* (2020.01)
*G06F 119/06* (2020.01)

(52) U.S. Cl.
CPC ............ *G06F 30/367* (2020.01); *G06F 30/38* (2020.01); *H02S 50/10* (2014.12); *G06F 2119/06* (2020.01)

(58) Field of Classification Search
CPC ............... G06F 30/367; G06F 2119/06; G06F 2111/10; G06F 30/00; Y02E 10/50
See application file for complete search history.

(56) References Cited

U.S. PATENT DOCUMENTS

2011/0068817 A1* 3/2011 Hashimoto ....... H01L 31/02021
136/252
2014/0077785 A1* 3/2014 Jiang ........................ G05F 1/67
323/299

OTHER PUBLICATIONS

Batzelis, E. I., et al., "Energy models for photovoltaic systems under partial shading conditions: a comprehensive review," IET Renewable Power Generation, Sep. 2014, 9(4), 340-349.
(Continued)

*Primary Examiner* — Jack Chiang
*Assistant Examiner* — Brandon Bowers
(74) *Attorney, Agent, or Firm* — Pillsbury Winthrop Shaw Pittman LLP

(57) ABSTRACT

A method for determining an electrical model of a string of photovoltaic modules from a characteristic I(V) of the string includes detecting a first linear zone and a second linear zone of the characteristic I(V); initialising the parameters of a non-by-pass electrical model corresponding to a first operating condition, called a non-by-pass condition; optimising the parameters of the non-by-pass electrical model from a reference characteristic $I(V_{ref})$ equal to I(V), determining the parameters of the electrical model corresponding to a second operating condition, called a by-pass condition, in order to obtain a by-pass electrical model from the characteristic determining, from the characteristic I(V) the best model among the non-by-pass model and the by-pass model.

10 Claims, 11 Drawing Sheets

(56) References Cited

OTHER PUBLICATIONS

Batzelis, E., et al., "An Algorithm to Detect Partial Shading Conditions in a PV System," (2016), Materials Science Forum, vol. 856, pp. 303-308.
Jordehi, A. R., "Parameter estimation of solar photovoltaic (PV) cells: a review," Renewable and Sustainable Energy Reviews 61, (2016), pp. 354-371.
El Basri, Y., et al., "A proposed graphical electrical signatures supervision method to study PV module failures," Solar Energy 116, 2015, pp. 247-256.
Search Report as issued in French Patent Application No. 1860499, dated Jul. 29, 2019.
Rezgui, W., et al., "Modeling of a photovoltaic field in malfunctioning," 2013 International Conference on Control, Decision, and Information Technologies, May 2013, XP032534839, pp. 788-793.
Chine, W., et al., "Fault diagnosis in photovoltaic arrays," 2015 International Conference on Clean Electrical Power (ICCEP), Jun. 2015, XP033186603, pp. 67-72.
Harrou, F., et al., "A robust monitoring technique for fault detection in grid-connected PV plants," 7th International Conference on Renewable Energy and Applications, Oct. 2018, XP033469621, pp. 594-598.

\* cited by examiner

METHOD FOR DETERMINING AN ELECTRICAL MODEL OF A STRING OF PHOTOVOLTAIC MODULES, DIAGNOSTIC METHOD AND DEVICE ASSOCIATED THEREWITH

CROSS-REFERENCE TO RELATED APPLICATIONS

This application claims priority to French Patent Application No. 1860499, filed Nov. 14, 2018, the entire content of which is incorporated herein by reference in its entirety.

FIELD

The technical field of the invention is that of the diagnostics of the strings of photovoltaic modules. The present invention relates to a method for determining a model of a string of photovoltaic modules and in particular a method which takes the by-pass effect into account. The present invention also relates to a method for detecting an anomaly in a string of photovoltaic modules.

BACKGROUND

It is known to diagnose a proper operation of a photovoltaic module by considering its curve I(V) (current measurement as a function of the voltage applied). This diagnostics is most often performed from "flash-test" measurements, that is the measurement I(V) under standard conditions. However, when it is attempted to diagnose modules on site, the analysis does not necessarily relate any longer to unit modules but most often strings of several modules. In addition, there can be much more varied types of faults such as the presence of shading for example. More particularly, it happens that the curve I(V) of a module or a string of modules has an inflection. This inflection occurs when a part of the string operates in a less favourable mode. In this case, by-pass diodes introduced in the modules therefor, makes the part of the "failing" string independent from the rest of the system to avoid that it is fully impacted. Such an event occurs for example in the event of a partial shading of the string, in the event of a non-homogeneous soiling on the string, in the event of a localised fault (like a hotspot), etc. In the present description, all these events are commonly referred to under the term "by-pass".

The effect of a by-pass on the curve I(V) of a string of modules and on the electrical model equivalent to a diode (noted "equivalent model" in the following) which models it is well known and described in Batzelis, E. I., Georgilakis, P. S., & Papathanassiou, S. A. (2014); Energy models for photovoltaic systems under partial shading conditions: a comprehensive review. IET Renewable Power Generation, 9(4), 340-349. However, no method enables the parameters of a model of the curve I(V) integrating a possible by-pass from a set of measurements to be estimated and a diagnostics to be performed from this estimation.

In Batzelis, E., & Papathanassiou, S. A. (2016). An Algorithm to Detect Partial Shading Conditions in a PV System; In Materials Science Forum (Vol. 856, pp. 303-308), a method is provided enabling the presence of a by-pass to be detected but the latter does not enable a diagnostics of the string of modules measured to be performed. In Jordehi, A. R. (2016). Parameter estimation of solar photovoltaic (PV) cells: a review; Renewable and Sustainable Energy Reviews, 61, 354-371, a method relying on equivalent models for diagnosing strings (supposed to be non-by-passed) is provided. However, there is no solution enabling both tasks to be performed: namely the determination of an equivalent model including in the presence of a by-pass. It should be noted that the sequential use of both previously discussed methods is not satisfactory because it does not enable information about the parameters of the equivalent model (and thus diagnostics other than "presence of a by-pass") to be provided in case of partial shading for example.

In El Basri, Y., Bressan, M., Seguier, L., Alawadhi, H., & Alonso, C. (2015). A proposed graphical electrical signatures supervision method to study PV module failures; Solar Energy, 116, there is provided a method in which the first derivative and the second derivative of the curve I(V) are considered. The analysis of both curves is used to suggest a diagnostics distinguishing in particular proper operation events from events where there is a by-pass (shading event in particular) and events of significant increase in the series resistance. However, it is useful to note that no estimation of parameters of the equivalent model is suggested (especially in the presence of a by-pass) and that the method suggested in this document is very sensitive to measurement noise (in particular because of the use of the first and second derivatives of the signal).

There is thus a need for a diagnostics method which is robust to measurement noise and quickly implementable, thus allowing an on-site use. There is also a need for a diagnostics method which makes no hypothesis on the environmental conditions and takes the possible presence of a by-pass into account.

SUMMARY

An aspect of the invention offers a solution to the previously discussed problems, by providing a diagnostics method which is robust to measurement noise (and thus adapted to an on-site implementation) and quickly implementable.

In the following, "I" denotes a set of current measurements (in Amperes) and "V" a set of voltage measurements (in Volts). I(V) thereby describes a set of points in a space the axis of abscissas of which corresponds to the voltage and the axis of ordinates of which corresponds to the current. "Y(W)" will denote the parametric curve in the same space which associates a current value Y as a function of a voltage value w.

For that end, a first aspect of the invention relates to a method for determining an electrical model of a string of photovoltaic modules from a characteristic I(V) of the string, the method comprising:
- a step of detecting a first linear zone and a second linear zone of the characteristic I(V),
- a step of initialising the parameters of a non-by-pass electrical model corresponding to a first operating condition, called a non-by-pass condition from the characteristic I(V),
- a step of optimising the parameters of the non-by-pass electrical model from a reference characteristic I($V_{ref}$) equal to I(V),
- a step of determining the parameters of the electrical model corresponding to a second operating condition, called a by-pass condition, in order to obtain a by-pass electrical model from the characteristic I(V),
- a step of determining, from the characteristic I(V), the best model among the non-by-pass model and the by-pass model.

Thanks to the invention, it is possible to obtain an equivalent electrical model while remaining efficient in terms of hypotheses and in terms of number of parameters (for example no measurement of the environment of the string, as irradiance or temperature, is necessary). Thus, a method is obtained, which operates even under environmental conditions far from standard conditions. In addition, the low computing time associated with the method according to a first aspect of the invention makes it compatible with an on-site diagnostics objective (the duration of the method is typically in the order of one tenth of a second on a laptop computer).

Beside the characteristics just discussed in the previous paragraph, the method according to a first aspect of the invention can have one or more complementary characteristics among the following ones, considered individually or according to any technically possible combinations.

In one embodiment, the non-by-pass model takes the following form:

$$Y = I_{ph} - \frac{W_{th} + R_s \times Y}{R_p} - I_0 \times \left( e^{\frac{W_{th} + R_s \times Y}{N}} - 1 \right)$$

with Y the current provided by the string, $I_{ph}$ the photocurrent, $W_{th}$ the voltage across the string under the hypothesis of no by-pass absence, $R_s$ the series resistance, $R_p$ the parallel resistance, $I_0$ the diode dark current and N a parameter defined by $$N = N_s \times n \times \frac{k_b}{q} \times T_c$$

where $N_s$ is the number of series cells in the string, n is the diode ideality factor, $k_b$ is the Boltzmann's constant, q is the elementary charge of a proton and $T_c$ is the temperature of the cells of the modules of the string.

In an embodiment, the method according to a first aspect of the invention comprises, before the step of detecting the linear zones of the characteristic I(V), a step of checking the data of the characteristic I(V).

This step enables the accuracy in determining the electrical model to be improved while removing unnecessary parts of the characteristic I(V) as measured.

In an embodiment, the step of checking the data of the characteristic I(V) comprises at least one of the two following sub-steps:
a sub-step of detecting the switching period of the string;
a sub-step of removing the outliers.

The characteristic I(V) is thus cleared from the outliers and/or data corresponding to measurements performed before switching the string desired to be diagnosed. As a reminder, the set of measurements I(V) necessary to the implementation of the method is obtained by gradually switching from an operation where the string of modules is short-circuited, to an operation where the string is open-circuited (or reversely). By switching period, it is meant the period which is between these two extreme events, that is the period during which the measurements I(V) are performed.

In an embodiment, the step of detecting a first linear zone and a second linear zone of the characteristic I(V) comprises:
a sub-step of determining the maximum power point ($I_{MPP}$, $V_{MPP}$), the points of the characteristic I(V) located above the straight line passing through the origin (0,0) and the point ($I_{MPP}$, $V_{MPP}$) being considered as candidates for the first linear zone close to $I_{sc}$, called the first linear zone, and the points located below this straight line being considered as candidates for the second linear zone close to $V_{oc}$, called the second linear zone;
a sub-step of determining the linear model of Y as a function of W such that $Y = a_{sc} \times W + b_{sc}$ from the candidate points for the first linear zone and the linear model of W as a function of Y such that $W = a_{oc} \times Y + b_{oc}$ from the candidate points for the second linear zone, so as to determine the parameters $a_{sc}$, $b_{sc}$, $a_{oc}$ and $b_{oc}$.

In an embodiment, during the step E3 of initialising the parameters of the non-by-pass electrical model, the parameters of the electrical model $I_{ph}$, $R_s$, $R_p$, $I_0$ and N are initialised in the following way:

$R_p$ is given by $$R_p = -\frac{1}{a_{sc}};$$

N is given by $$N = \frac{k}{q} \times N_s \times T_{init}$$

with $T_{init} \in [200,200]$, preferably $T_{init} \in [230,240]$, or even $T_{init} = 233.15$;

$I_0$ is given by $$I_0 = \frac{R_p \times b_{sc} - b_{oc}}{R_p \left( e^{\frac{b_{oc}}{N}} - 1 \right)};$$

$R_s$ is given by $$R_s = -a_{oc} - \frac{N \times R_p}{N + I_0 \times R_p \times e^{\frac{b_{oc}}{N}}};$$

and
$I_{ph}$ is given by $$I_{ph} = \frac{R_p + R_s}{R_p} \times b_{sc} + I_0 \times \left( e^{\frac{R_s \times b_{sc}}{N}} - 1 \right);$$

with $I_{ph}$ the photocurrent, $R_s$ the series resistance, $R_p$ the parallel resistance, $I_0$ the diode dark current, $N_s$ the number of series cells in the string, $k_b$ is the Boltzmann's constant and q is the elementary charge of a proton.

In an embodiment, the step of optimising the parameters of the non-by-pass electrical model comprises:
a first sub-step of optimising the parameters of the linear component of the non-by-pass electrical model;
a second sub-step of optimising the parameters of the exponential component of the non-by-pass electrical model;
the first and second sub-steps being iterated a plurality of times so as to obtain a non-by-pass model.

Thus, the optimisation of the parameters of the non-by-pass model can be performed in two sub-steps which makes the optimisation less computational intensive. It is thus possible to obtain separate estimations of the parameters of the linear component and of the exponential component. These two sub-steps are reiterated so as to improve the accuracy of the parameters of the model. Thus, during the iterations, a cross-compensation of the linear and exponential components is obtained, enabling the estimation of either one to be simplified.

In an embodiment, the sub-step of optimising the parameters of the linear component of the non-by-pass model comprises:
- a phase of determining a linear characteristic I(V) so as to obtain $l_{linear}(V)$,
- a phase of determining the linear regression of the equation $a_{sc} \times W + b_{sc}$ from the curve $l_{linear}(V)$;
- a phase of determining the parameters of the linear component of the non-by-pass model from the regression.

In an embodiment, the sub-step of optimising the parameters of the exponential component of the model comprises:
- a phase of determining a linear characteristic V(I) so as to obtain $V_{linear}(I)$,
- a phase of determining the linear regression of the equation $a_{oc} \times Y + b_{oc}$ from the curve $V_{linear}(I)$,
- a phase of determining the parameters of the exponential component of the non-by-pass model from the regression.

In an embodiment, the step of determining the parameters of the by-pass electrical model comprises:
- a first sub-step of initialising a first parameter $P_d$ and a second parameter $P_I$ which are characteristic of the by-pass;
- a second sub-step of determining, from the parameters $P_d$ and $P_I$ the characteristic $W_{mod}(Y)$ associated with the by-pass model;
- a third sub-step of optimising the parameters $P_d$ and $P_I$ of the by-pass model $W_{mod}(Y)$ from the characteristic I(V);
- a fourth sub-step of deforming, from the parameters $P_d$ and $P_I$, the curve I(V) so as to obtain a non-by-pass characteristic $I(V_{unshaded})$;
- a fifth sub-step of optimising the parameters of the non-by-pass electrical model from a reference characteristic $I(V_{ref})$ equal to $I(V_{unshaded})$.

A second aspect of the invention relates to a method for detecting an anomaly in a string of photovoltaic modules comprising:
- a step of determining the electrical model of the string of modules using a method according to a first aspect of the invention;
- a step of detecting an anomaly as a function of the value of at least one parameter of the electrical model determined.

A third aspect of the invention relates to a data processing device comprising means for implementing the method according to a first aspect or a second aspect of the invention.

A fourth aspect of the invention relates to a computer program comprising machine executable instructions which, when the program is run on a computer, cause the latter to implement the method according to a first aspect or a second aspect of the invention.

A fifth aspect of the invention relates to a computer-readable data medium, on which the computer program according to a fourth aspect of the invention is recorded.

The invention and its different applications will be better understood upon reading the description that follows and upon examining the accompanying figures.

BRIEF DESCRIPTION OF THE FIGURES

The figures are shown for of indicating and in no way limiting the invention.

DETAILED DESCRIPTION OF AT LEAST ONE EMBODIMENT OF THE INVENTION

Unless otherwise indicated, a same element appearing in different figures has a single reference.

Figure 1:
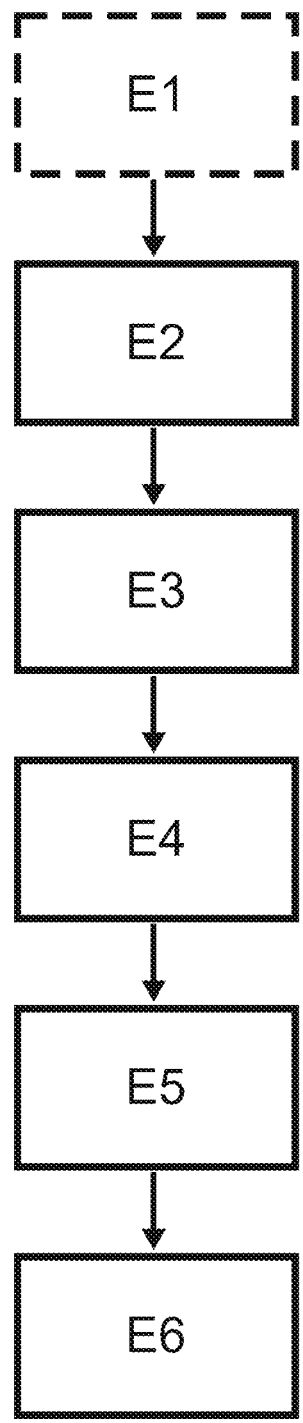
FIG. 1 shows a flowchart of an embodiment of a method according to a first aspect of the invention.

An embodiment of a first aspect of the invention illustrated in FIG. 1 relates to a method 100 for determining an electrical model of a string of photovoltaic modules from a characteristic I(V). This characteristic I(V) could be measured during tests at the end of the production line but also during the operation of the string of modules on site. To that end, in an embodiment, the method 100 according to a first aspect of the invention comprises a step of acquiring a characteristic I(V). In the following, the terms characteristic I(V) and curve 100 could be used indifferently. In addition, $V_i$ (respectively $I_i$) will denote the value of V (respectively I) for the i-th point of the curve (or the i-th measurement, each point corresponding to a measurement). In addition, unless otherwise indicated, the units used are the international system units (I.S.U.).

Definition of the Electrical Model

Figure 2:
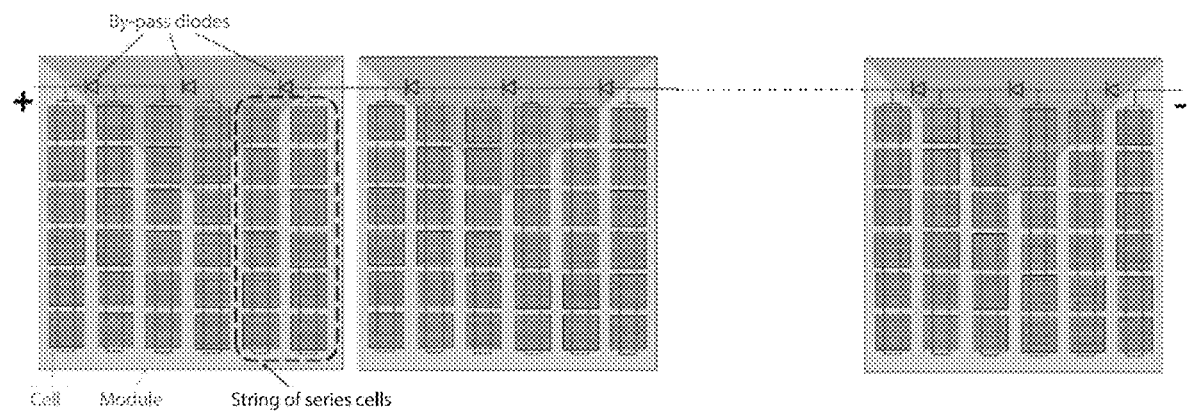
FIG. 2 shows a schematic representation of a string of modules that can be subjected to a method according to a first or a second aspect of the invention.

A string of photovoltaic modules as illustrated in FIG. 2 is often described by an electrical model equivalent to "a diode". This model can be indifferently used to describe a cell, a module or a string of modules (within a coefficient) and makes it possible to relate the voltage V and the current I generated by the string it models. It can be represented as an equivalent circuit as that illustrated in FIG. 3. A model with one diode has the benefit of being one of the simplest and the most efficient in terms of parameters. However, unlike models with two diodes, it does not model the heterogeneity of the semiconductor and has a lower performance under low lighting. The method according to an aspect of the invention will be illustrated in the following using a model with "one diode" but it can be used with any type of model. It is however desirable that the model has a linear component and an exponential component.

Figure 3:
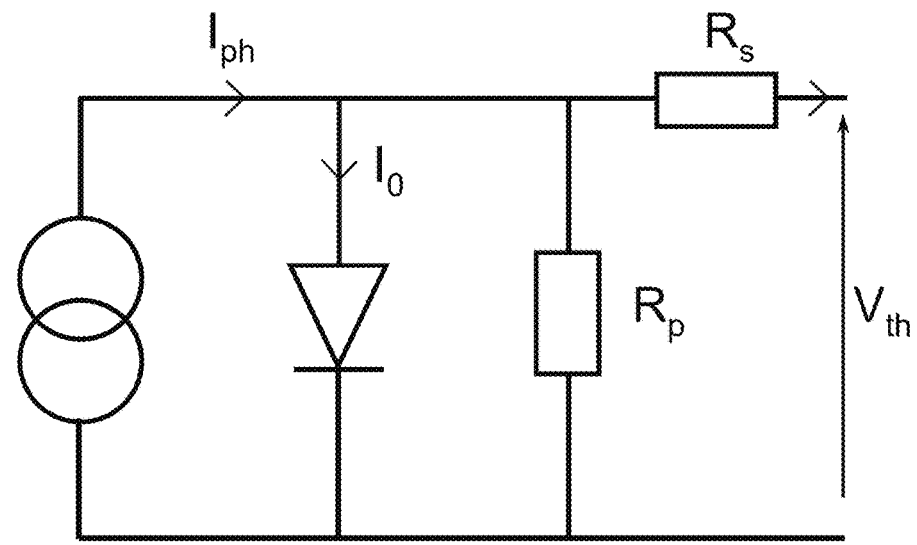
FIG. 3 shows a circuit diagram of an equivalent model of a string of modules.

The model with one diode illustrated in FIG. 3 can be written in the following form:

$$Y = I_{ph} - \frac{W_{th} + R_s \times Y}{R_p} - I_0 \times \left(e^{\frac{W_{th}+R_s \times Y}{N}} - 1\right)$$

with Y the current provided by the string, $I_{ph}$ the photocurrent, $W_{th}$ is the voltage across the string under the hypothesis of no by-pass, $R_s$ is the series resistance, $R_p$ is the parallel resistance, $I_0$ is the diode dark current and N is a parameter defined by $$N = N_s \times n \times \frac{k_b}{q} \times T_c$$

where $N_s$ is the number of series cells in the string, n is the diode ideality factor, $k_b$ is the Boltzmann's constant, q is the proton elementary charge and $T_c$ is the temperature of the cells of the modules of the string. It will be noted that the model can be re-written in the following way:

$$W_{th} = R_p \times I_{ph} + (R_s + R_p) \times Y - R_p \times I_0 \times \left(e^{\frac{W_{th}+R_s \times Y}{N}} - 1\right).$$

From this model, it is thus possible to obtain Y as a function of $W_{th}$ or $W_{th}$ as a function of Y, for example by iterative computing methods or by using the Lambert W function.

It will be noted that N depends on two initially unknown parameters: n and $T_c$. However, as a first approximation, it is possible to choose n as being equal to 1.25 which is a mean value accepted for new photovoltaic modules. In addition, the temperature $T_c$ can be computed using the following formula:

$$T_c = \frac{\frac{(V_{oc} - V_{oc}^{STC})}{\beta_{V_{oc}} \times \frac{V_{oc}^{STC}}{100}} + T_{STC}}{1 + N_s \times n \times \frac{k}{q} \times \log\left(\frac{I_{sc}}{I_{sc}^{STC}}\right)}$$

with $V_{oc}$ the open-circuit voltage, $V_{oc}^{STC}$ the open-circuit voltage under STC (standard test conditions) conditions, $\beta V_{oc}$ the voltage loss coefficient with an increase in the cell temperature (most often this coefficient is negative), $T_{STC}$ the temperature under STC conditions (and is 298.15K that is about 25° C.), $I_{sc}$ the short-circuit current and $I_{sc}^{STC}$ the short-circuit current under STC conditions. It should be noted that the voltage across the open-circuit cell under STC conditions $V_{oc}^{STC}$, the voltage loss coefficient with an increase in the cell temperature $\beta_{V_{oc}}$, and the short-circuit current under STC conditions $V_{oc}^{STC}$ are most often provided by the cell or module manufacturer and thus are not to be determined. The value of $I_{sc}$ and $V_{oc}$ can in turn be determined from the curve Y(W). Indeed, the value of $I_{sc}$ is given by the intersection of the curve Y(W) and the axis of ordinates whereas the value of $V_{oc}$ is given by the intersection of the curve Y(W) and the axis of abscissas.

The model just shown does not take the by-pass effect into account and thus will be called "non-by-pass model" in the following.

Boundary Values of the Parameters of the Electrical Model

Upon implementing the method according to a first aspect of the invention, it will be sometimes desirable to check that some parameters (either parameters of the model or intermediate parameters necessary for computations) do not exceed some boundary values. For more clarity, all these boundaries will be detailed herein. It is a possible example of boundaries to impose upon implementing a method according to the invention. It will be appreciated that other boundaries can be contemplated.

The parameter $P_d$ which represents the proportion of by-pass diodes which are potentially by-passed is limited in the following way:

$$P_d^{min} = \max\left(\frac{V_{max-1}}{V_{max}}, \frac{N_d}{4}, 0.01\right)$$

and $$P_d^{max} = 1 - \max\left(\frac{V_{min+1}}{V_{max}}, \frac{N_d}{4}, 0.01\right)$$

with $V_{min}$ the smallest value of V, $V_{min+1}$ the second smallest value of V, $V_{max-1}$ the second greatest value of V and $V_{max}$ the greatest value of V.

The parameter $P_I$ which represents the short-circuit current loss induced on the sub-string if it were insulated with respect to what it is in the sub-string not affected is limited the following way:

$$P_I^{min}=0.025 \text{ and } P_I^{max}=0.975$$

The parameter $I_{sc}$ which representing the short-circuit current is limited in the following way:

$$I_{sc}^{min} = \max\left(\frac{I_{sc}^{STC}}{1000}, 0.9 \times \text{median}(I)\right)$$

and $$I_{sc}^{max} = \min(1.5 \times I_{sc}^{STC}, 1.1 \times \max(I))$$

with median(x) represents the median value of the variable x.

The parameter $V_{oc}$ which represents the open-circuit voltage is limited the following way:

if LOGI<0

$$V_{oc}^{min} = V_{oc}^{STC} \times \max\left(1 + \frac{\beta_{V_{oc}}}{100} \times \left(\left(1 + LOGI \times \frac{k_b}{q} \times N_s\right) \times 373.15\right), 0.01\right)$$

and $$V_{oc}^{max} = V_{oc}^{STC} \times \min\left(1 + \frac{\beta_{V_{oc}}}{100} \times \left(\left(1 + LOGI \times \frac{k_b}{q} \times N_s\right) \times 233.15\right), 2\right)$$

otherwise $$V_{oc}^{min} = V_{oc}^{STC} \times$$
$$\max\left(1 + \frac{\beta_{V_{oc}}}{100} \times \left(\left(1 + 3 \times LOGI \times \frac{k_b}{q} \times N_s\right) \times 373.15 - T_{STC}\right), 0.01\right)$$

and $$V_{oc}^{max} =$$
$$V_{oc}^{STC} \times \min\left(1 + \frac{\beta_{V_{oc}}}{100} \times \left(\left(1 + 3 \times LOGI \times \frac{k_b}{q} \times N_s\right) \times 373.15 - T_{STC}\right), 2\right)$$

with, when the value of $I_{sc}$ has already been estimated, $$LOGI = \log\left(\frac{I_{sc}}{I_{sc}^{STC}}\right);$$

otherwise $$\log\left(\frac{I_{sc}^{max}}{I_{sc}^{STC}}\right).$$

The parameter $R_p$ which designates the parallel resistance is limited in the following way:

$$R_p^{min} = 1.05 \times \max(a_1^{diag}, a_2^{diag})$$

and $$R_p^{max} = 100 \times \max(a_1^{diag}, a_2^{diag})$$

where $$a_1^{diag} = \frac{V_{max} - V(I_{max})}{I_{max} - I(V_{max})} \text{ if } \frac{V_{max} - V(I_{max})}{I_{max} - I(V_{max})}$$

is defined and $$a_1^{diag} = \frac{V_{max}}{I_{max}}$$

otherwise, $V_{max}$ being the maximum value of V, $I_{max}$ being the maximum value of I, $V(I_{max})$ is the value of V for the point of the curve I(V) where I is maximum and $I(V_{max})$ is the value of I for the point of the curve I(V) where V is maximum.

The parameter $R_s$ which represents the series resistance is limited the following way:

$$R_s^{min} = 0.01 \times \max(a_1^{diag}, a_2^{diag})$$

and $$R_s^{max} = 0.95 \times \max(a_1^{diag}, a_2^{diag})$$

The parameter $I_0$ which represents the diode dark current of the equivalent model is limited the following way:

$$I_0^{min} = 10^{-30} \times \max(I_{sc}^{STC}, 1)$$

and $$I_0^{max} = 10^{-3} \times \max(I_{sc}^{STC}, 1)$$

The parameter N detailed before is limited the following way:

$$N^{min} = \min\left(\max\left(N_s \times \frac{k}{q} \times 233.15, \frac{b_{oc}}{50}\right), 1000 \times b_{oc}\right)$$

and $$N^{max} = \min\left(\max\left(3 \times N_s \times \frac{k}{q} \times 273.15, \frac{b_{oc}}{50}\right), 1000 \times b_{oc}\right)$$

where the parameter $b_{oc}$ is a parameter which will be defined in the following of the description. The limitation as regards N ensures that $T_c$ remains included between −40° C. and 100° C. and that n remains included between 1 and 3. It also ensures that N is between 2% and 100 000% of $b_{sc}$ (parameter which will be defined in the following) in order to ensure that the value $$\exp\left(\frac{W \times R_s \times Y}{N}\right)$$

remains in the computable field.

When, upon checking a parameter, the latter exceeds one of the boundaries set thereto, then the value of the parameter is chosen as being equal to the boundary exceeded.

Comparison Between an Electrical Model and Measurements

In a method for determining a model, it is important to compare the possible models with measurements, that is quantify the matching between a model and a set of measurements $V_{ref}(I)$ where $V_{ref}$ are reference data. These data can directly come from the measurement or be obtained after deforming the initial data, for example to compensate for a by-pass phenomenon (this aspect will be detailed in the following).

Several solutions are contemplatable to quantify such matching. A known method is the use of a normalised root mean square error (NRMSE). This metric however has drawbacks in the present case, and in particular that of giving more importance to the exponential part.

In an embodiment, the function S(W,V) with W the model to be evaluated and V the measurements (modified or not) is defined as follows:

$$S(W,V) = \int_0^{I_{sc}} |W(Y) - V(Y)| \times dY$$

In practice, the function s is computed by assimilating the curve of measurements of V as a function of I to its linear interpolation as follows:

$$S(W, V) = \sum_{i=1}^{cardinal(I)-1} \frac{|W(I_i) - V(I_i)| + |W(I_{i+1}) - V(I_{i+1})|}{2} \times (I_{i+1} - I_i)$$

where $\{I_1, I_2, \ldots, I_{cardinal(I)}\}$ describes the list of the values of the vector I ordered in the increasing order. Computing the function S is thus quickly executable although the cases where the curves W and V intersect each other are ignored. In addition, S makes up a fit quality adjustment between the model W and the measurement V, this function being null if the model W perfectly fits the measurements V, and increasing with an increasing deviation between the model W and the measurements V.

This original cost evaluation function avoids convergence faults or separability problems of the conventional evaluation metrics and offers a direct solution for estimating highly correlated parameters (as $I_0$ and N in particular).

Checking the Data

Figure 4:
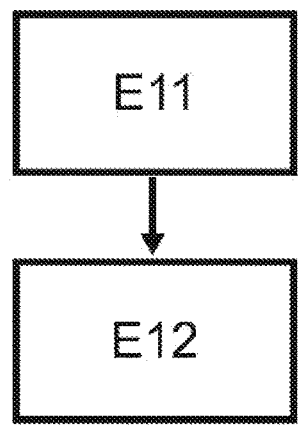
FIG. 4 shows a flowchart of a step of an embodiment of a method according to a first aspect of the invention.

The method according to an aspect of the invention suggests, from a measurement of the characteristic I(V) of a string of modules, to determine the parameters of the equivalent electrical model of the string. However, it often happens that the measurement of the characteristic I(V) is not to be fully taken into account and/or includes outliers. In order to retain only the necessary part of the characteristic I(V), in an embodiment illustrated in FIGS. 4 to 6, the method comprises a step E1 of checking the data of the characteristic I(V).

Figure 5:
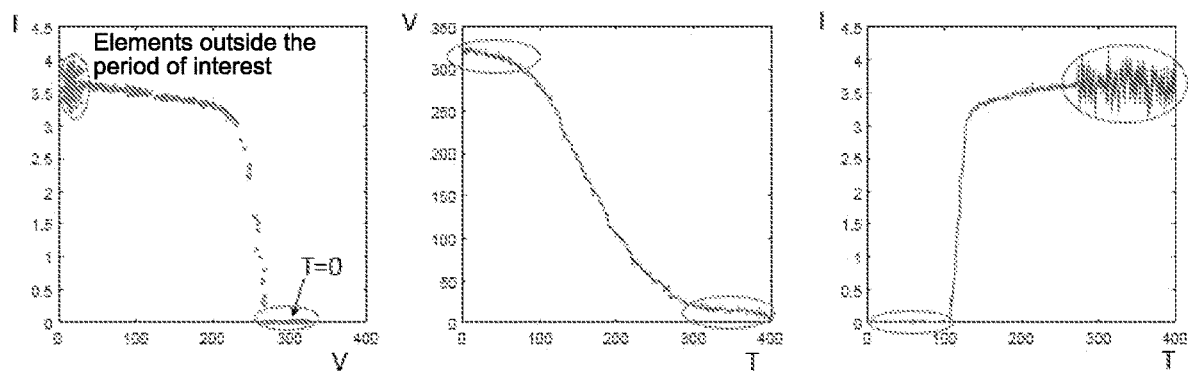
FIG. 5 shows a representation of the characteristic I(V) (on the left) of the voltage V as a function of time (in the centre) and of the current I as a function of time (on the right).
Figure 6:
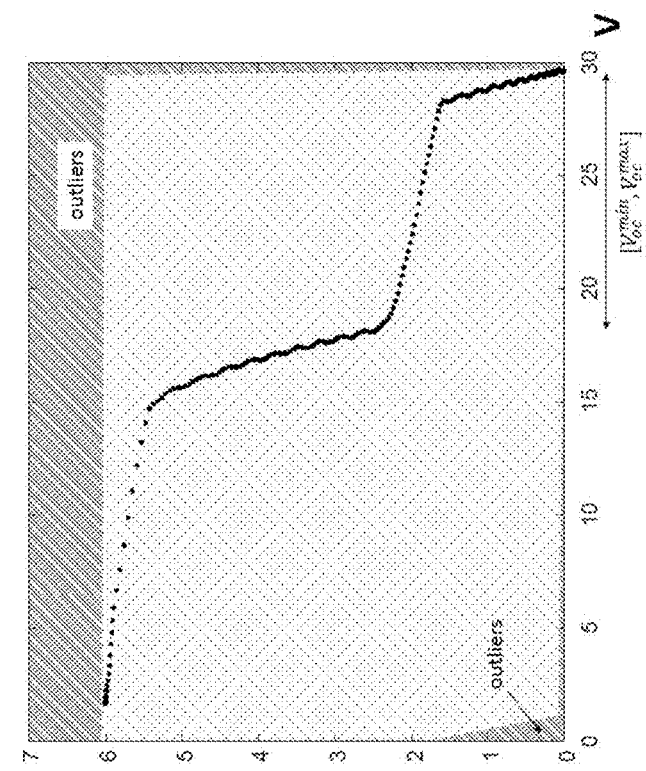
FIG. 6 shows a representation of the non-by-pass (on the left) characteristic I(V) and by-pass (on the right) characteristic I(V) as well as the zones outside the which data are considered as aberrant.
Figure 6:
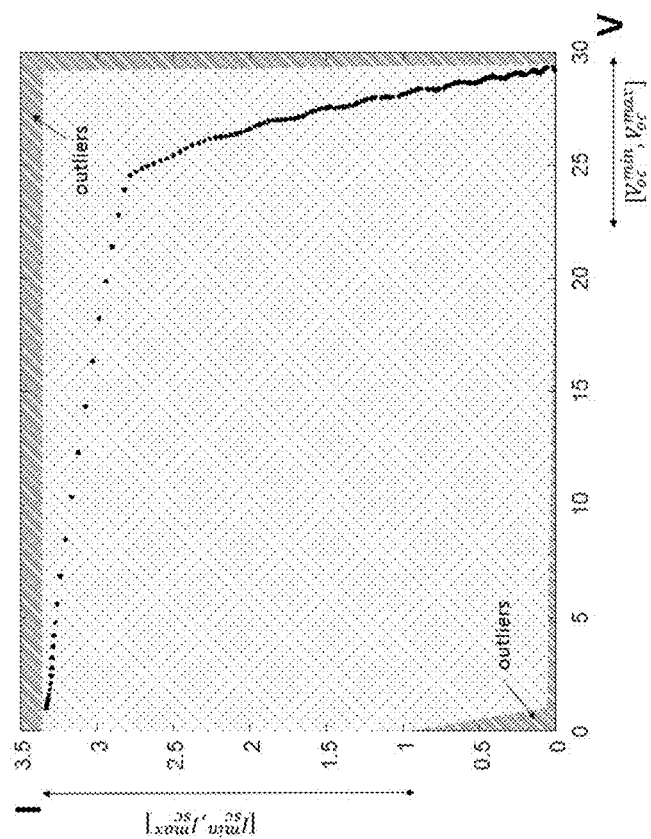

For example, as illustrated in FIG. 5, recording the characteristic I(V) can be started before string switching and stopped after string switching. FIG. 5 represents on the left the characteristic I(V), in the middle the voltage V as a function of time and on the right the current I as a function of time. In the case illustrated in FIG. 5, a non-negligible noise is present at the start and at the end of the signal (surrounded zones in FIG. 5), which can reduce the accuracy in determining the parameters of the model. In order to remove the parts of the characteristic I(V) not corresponding to a period during which the string of modules is switched, in an embodiment, the step E1 of checking the data of the characteristic I(V) comprises a sub-step E11 of detecting the switching period. A way to carry out this detection is to take account of the fact that, when the string is switched, the curve I(V) is always increasing and the curve V(I) is always decreasing. If the curve V(I) is considered (but the same can be made for a curve I(V)), it is possible to compute the derivative on the entire measurement period. Outside the period of interest, the variations measured are on the one hand due to modifications in the environmental conditions (supposed to be random with a symmetric probability law) and on the other hand, due to a measurement noise (also supposed to be random, of a symmetric and independent law). Therefore, on a sliding window, the number of positive signs of the signal derivative should thus obey a binomial distribution with parameter L and ½ where L is the window width. On the contrary, in the periods of interest (that is when the string is switched), most of the signs should be negative (or positive if the characteristic I(V) is considered). For each sliding window, the probability of obtaining randomly the ratio $$\frac{\text{Positive sign}}{\text{Negative sign}}$$

observed and to deduce from this ratio whether the sliding window relates to a switching period of the string or not can thus be quantified. For example, the switching period is considered as started when the sliding window gives a probability lower than a chosen boundary (for example 5%) that the sign distribution obeys a binomial distribution. Likewise, the operating period is considered as finished when the previous condition is no longer met. It is thus possible to determine the period during which the string of modules is switched.

The characteristic I(V) can also comprise outliers, that is data that are not representative of the string of modules the model of which is actually attempted to be determined. It can thus be advantageous to remove them. To that end, in an embodiment illustrated in FIG. 6, the step E1 of checking the data of the characteristic I(V) comprises a sub-step E12 of removing outliers. In an embodiment, the points corresponding to a current higher than $I_{sc}^{max}$ or to a voltage higher than $V_{oc}^{max}$ are removed. In an embodiment also illustrated in FIG. 6, the points located above a curve Y(W) based on the extreme values of the different parameters of the equivalent model are removed. In other words, the current Y(W) is computed by taking $I_{ph}=I_{sc}^{max}$, $R_s=R_s^{min}$, $R_p=R_p^{max}$, $N=N^{min}$ as well as:

$$I_0 = \frac{I_{sc}^{max} - \frac{V_{oc}^{max}}{R_p^{max}}}{\exp\left(\frac{V_{oc}^{max}}{N_s \times \frac{k}{q} \times 233.15}\right) - 1}.$$

It will be appreciated that, it will be checked that $I_0$ remains within the boundaries imposed (e.g. it will be monitored that the voltage maximum value of the boundary curve remains below $V_{oc}^{max}$). Likewise, the values of V should never be under the following curve:

$$W = V_{oc}^{max} \times \left(1 - \frac{Y}{I_{sc}^{min}}\right) \times (1 - P_d^{min}).$$

Also, in an embodiment, the points located under this curve are also removed. Further, the values of I should never be located under the following curve:

$$Y = I_{sc}^{min} \times \left(1 - \frac{W}{V_{oc}^{min}}\right) \times (1 - P_i^{min}).$$

Also, in an embodiment, the points located under this curve are also removed.

The step E1 of checking the data just described is not mandatory but can in some cases, result in a sensitive improvement in the accuracy in determining the parameters of the electrical model.

Figure 7:
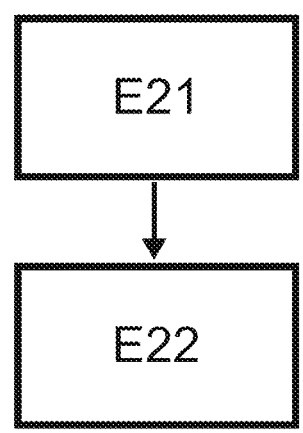
FIG. 7 shows a flowchart of a step of one embodiment of a method according to a first aspect of the invention.
Figure 8:
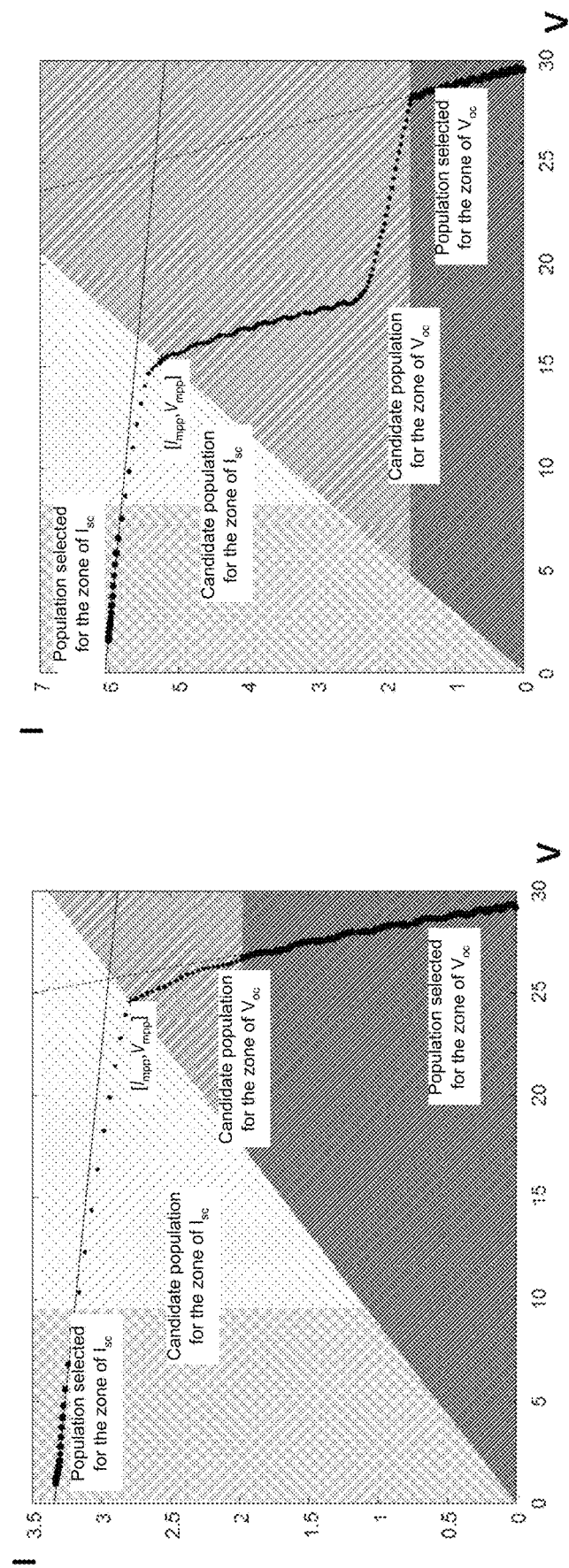
FIG. 8 shows a schematic representation of a determination of the linearity zones of the non-by-pass (on the left) characteristic I(V) and the by-pass (on the right) characteristic I(V).

Detecting the Linear Zones and Initialising the Parameters of the Non-by-Pass Electrical Model The method according to a first aspect of the invention then comprises a step E2 of detecting a first linear zone and a second linear zone of the characteristic I(V). As illustrated in FIG. 8, the two ends of the curve MO can be approximated by a linear model (FIG. 8 represents on the left a non-by-pass characteristic I(V) and thus without inflection and on the right, a by-pass characteristic I(V) and thus with inflection). The purpose is thus to detect the points of the curve I(V) which are in line with each of both quasi-linear states. In an embodiment illustrated in FIG. 7, in order to identify the quasi-linear zones, the method comprises a sub-step E21 of determining the maximum power point the coordinates of which are given by ($I_{MPP}$, $V_{MPP}$) where $I_{MPP} \times V_{MPP} = \max(I \times V)$, that is $I_{MPP}$ and $V_{MPP}$ are the current and voltage at the maximum power point. The points located above the straight line connecting (0,0) and ($I_{MPP}$, $V_{MPP}$) are supposed to be candidates for belonging to a first linear zone, called the linear zone close to $I_{sc}$ (that is the linear zone at the top left in the characteristic I(V)), and the points located under this straight line are supposed to be candidates for belonging to the second linear zone, called the linear zone close to $V_{oc}$ (that is the linear zone at the bottom right in the characteristic IM). This separation is illustrated in FIG. 8, the hatched zones corresponding to the candidates for belonging to the linear zone close to V and the dotted zones corresponding to the candidates for belonging to the linear zone close to $I_{sc}$.

Then, it comprises a sub-step E22 of determining the linear model of Y as a function of W such that $Y = a_{sc} \times W + b_{sc}$ for the linear zone close to $I_{sc}$ and the linear model of W as a function of Y such that $W = a_{oc} \times Y + b_{oc}$ for the linear zone close to $V_{oc}$ so as to determine the parameters $a_{sc}$, $b_{sc}$, $a_{oc}$ and $b_{oc}$.

For example, if the linear zone close to $V_{oc}$ is considered, a plurality of values k is tested, the value of k being incremented as $V_{MPP}$ is closer (in other word, $V(k) > V(k+1)$). To that end, for each value of k, the coefficients $a_k$ and $b_k$ are determined by performing a linear regression of the curve $\{V(i)\}_{i=1,\ldots,k}$ as a function of $\{I(i)\}_{i=1,\ldots,k}$ so as to obtain a linear approximation $W = a_k \times Y + b_k$. Then, each value of k, is associated with an error, the error being obtained by summing the costs for any such that $V(i) > V_{MPP}$ (the i being incremented in the same way as the k), the cost associated with a i being given by $$\left( \frac{V(i) - (a_k \times I(i) + b_k) - V_{maxi}}{V(i) - V_{maxi}} \right)^2$$

if i<k and $$\exp\left( \frac{V(i) - (a_k \times I(i) + b_k) - V_{maxi}}{V(i) - V_{maxi}} \right)$$

if i>k. Finally, the value of k for which the error is the smallest, noted $k_{sol}$, is determined, the parameters of the linear model being thereby given by $a_{oc} = a_{k_{sol}}$ and $b = b_{k_{sol}}$. The k points are represented in FIG. 8 by the dark hatched zone, the points such that i>k and $V(i) > V_{MPP}$ being in turn located in the light hatched zone. The dotted straight line represents in turn the straight line with the equation $W = a_{oc} \times Y + b_{oc}$.

In the same way, if the linear zone close to $I_{sc}$ is considered, a plurality of values k' is tested, the value of k' being incremented as $I_{MPP}$ is closer (in other words, $I(k') > I(k'+1)$). To that end, for each value of k', the coefficients $a_k'$ and $b_k'$ are determined, by performing a linear regression of the curve of $\{I(i')\}_{i'=1,\ldots,k'}$ as a function of $\{V(i)\}_{i'=1,\ldots,k'}$ so as to obtain a linear approximation $Y = a_{k'} \times W + b_{k'}$. Then, for each value of k' is associated with an error, the error being obtained by summing the costs for any i' such that $I(i') > I_{MPP}$ (the i' being incremented in the same way as the k'), the cost associated with an i' being given by $$\left( \frac{I(i') - (a_k \times V(i') + b_{k'}) - I_{maxi}}{I(i') - I_{maxi}} \right)^2$$

if i'<k' and $$\exp\left( \frac{I(i') - (a_{k'} \times V(i') + b_{k'}) - I_{maxi}}{I(i') - I_{maxi}} \right)^2$$

if i'>k'. Finally, the value of for which the error is the smallest, noted $k'_{sol}$, is determined, the parameters of the linear model being thereby given by $a_{sc} = a_{k'_{sol}}$ and $b_{sc} = b_{k'_{sol}}$. The k' points are represented in FIG. 8 by the dark dotted zone, the points such that i'>k' and $I(i') > I_{MPP}$ being in turn located in the light dotted zone. The solid straight line represents in turn the straight line with the equation $W = a_{sc} \times Y + b_{sc}$.

At the end of the step of detecting the linear zones of the characteristic I(V), the parameters $a_{sc}$, $b_{sc}$, $a_{oc}$ and $b_{oc}$ are thus determined.

In an embodiment, the value of the parameters $a_{sc}$, $b_{sc}$, $a_{oc}$ and $b_{oc}$ is compared with boundary values, the final value retained being the value of the parameter itself or the value of the boundary exceeded by the parameter. A first boundary relates to $a_{sc}$ and can be described as follows:

$$-\frac{1}{R_p^{min}} \leq a_{sc} \leq -\frac{1}{R_p^{max}}.$$

A second boundary relates to $a_{oc}$ and can be described as follows:

$$-R_s^{max} \leq a_{oc} \leq -R_s^{min}.$$

A third boundary relates to $b_{sc}$ and can be described as follows:

$$I_{sc}^{min} \leq b_{sc} \leq I_{sc}^{max}.$$

This boundary is different from the boundary previously shown because, during the initialising phase, no estimation of the parameter $R_s$ is available. It will be appreciated that, when an estimation of this parameter is available, the definition of the boundary relating to $b_{sc}$ to be used is that shown in the paragraph explaining the different boundaries in detail.

A fourth boundary relates to $b_{oc}$ and can be written as follows:

$$V_{oc}^{min} \leq b_{oc} \leq V_{oc}^{max}.$$

As already mentioned, the final value retained is the value of the parameter itself or the value of the boundary exceeded by the parameter. Thus, for example, if the value of $a_{sc}$ is actually included between $$-\frac{1}{R_p^{min}} \text{ and } -\frac{1}{R_p^{max}},$$

then the latter is not modified. On the other hand, if $$a_{sc} > -\frac{1}{R_p^{max}},$$

then the value $a_{sc}$ will be chosen as being equal to $$-\frac{1}{R_p^{max}}.$$

Likewise, if $$a_{sc} < -\frac{1}{R_p^{max}},$$

then the value $a_{sc}$ will be chosen as being equal to $$-\frac{1}{R_p^{min}}.$$

The method then comprises a step E3 of initialising the parameters of the non-by-pass electrical model. As previously shown, the parameters of the non-by-pass electrical model are $I_{ph}$, $R_s$, $R_p$, $I_0$ and N. In an embodiment, $R_p$ is given by $$R_p = -\frac{1}{a_{sc}};$$

N is given by $$N = \frac{k}{q} \times N_a \times T_{init}$$

with $T_{init} \in [200,300]$, preferably $T_{init} \in [230,240]$, or even $T_{init} = 233.15$ (that is a temperature of about −40° C.); $I_0$ is given by $$I_0 = \frac{R_p \times b_{sc} - b_{cc}}{R_p \left( e^{\frac{b_{oc}}{N}} - 1 \right)}$$

which ensures that the value of $V_{oc}$ will remain close to $b_{oc}$; $R_s$ is given by $$R_s = -a_{oc} - \frac{N \times R_p}{N + I_o \times R_p \times e^{\frac{b_{oc}}{N}}}$$

which ensures that the derivative of the curve I(V) in proximity of $V_{oc}$ is close to $a_{oc}$; and $I_{ph}$ is given by $$I_{ph} = \frac{R_p + R_s}{R_p} \times b_{sc} + I_0 \times \left( e^{\frac{R_s \times b_{sc}}{N}} - 1 \right)$$

which ensures that $I_{sc}$ is close to $b_{sc}$.

In an embodiment, the value of the parameters $I_{ph}$, $R_s$, $R_p$, $I_0$ and N is compared with the abovementioned boundary values, the final value retained being the value of the parameter itself or the value of the boundary exceeded by the parameter.

Optimising the Parameters of the Non-by-Pass Model

At the end of this step, all the parameters of the non-by-pass model have been initialised. This initialisation has been performed from the linear zones of the curve I(V) and by ensuring that the parameters thus determined fulfilled some boundaries. In order to improve the accuracy of these parameters, the method then comprises a step E4 of optimising the parameters of the non-by-pass electrical model from a reference characteristic $I(V_{ref})$ equal to I(V). It will be appreciated that, from the reference characteristic $I(V_{ref})$ means also that the corresponding characteristic $V_{ref}(I)$ is considered.

It is however very computational intensive (but not impossible including within the scope of the present invention) to simultaneously optimise all the 5 parameters of the non-by-pass electrical model. Therefore, it can be beneficial to divide the optimisation into several steps. To that end, in an embodiment, two components the optimisation of which is relatively easy are considered: a linear component and an exponential component. As a reminder, the non-by-pass electrical model can be written in the following form:

$$Y = I_{ph} - \frac{W_{th} + R_s \times Y}{R_p} - I_0 \times \left( e^{\frac{W_{th} + R_s \times Y}{N}} - 1 \right)$$

In the following, the component $$I_{ph} - \frac{W_{th} + R_s \times Y}{R_p}$$

will be designated as the linear component and the component $$I_0 \times \left( e^{\frac{W_{th} + R_s \times Y}{N}} - 1 \right)$$

will be designated as the exponential component.

Figure 9:
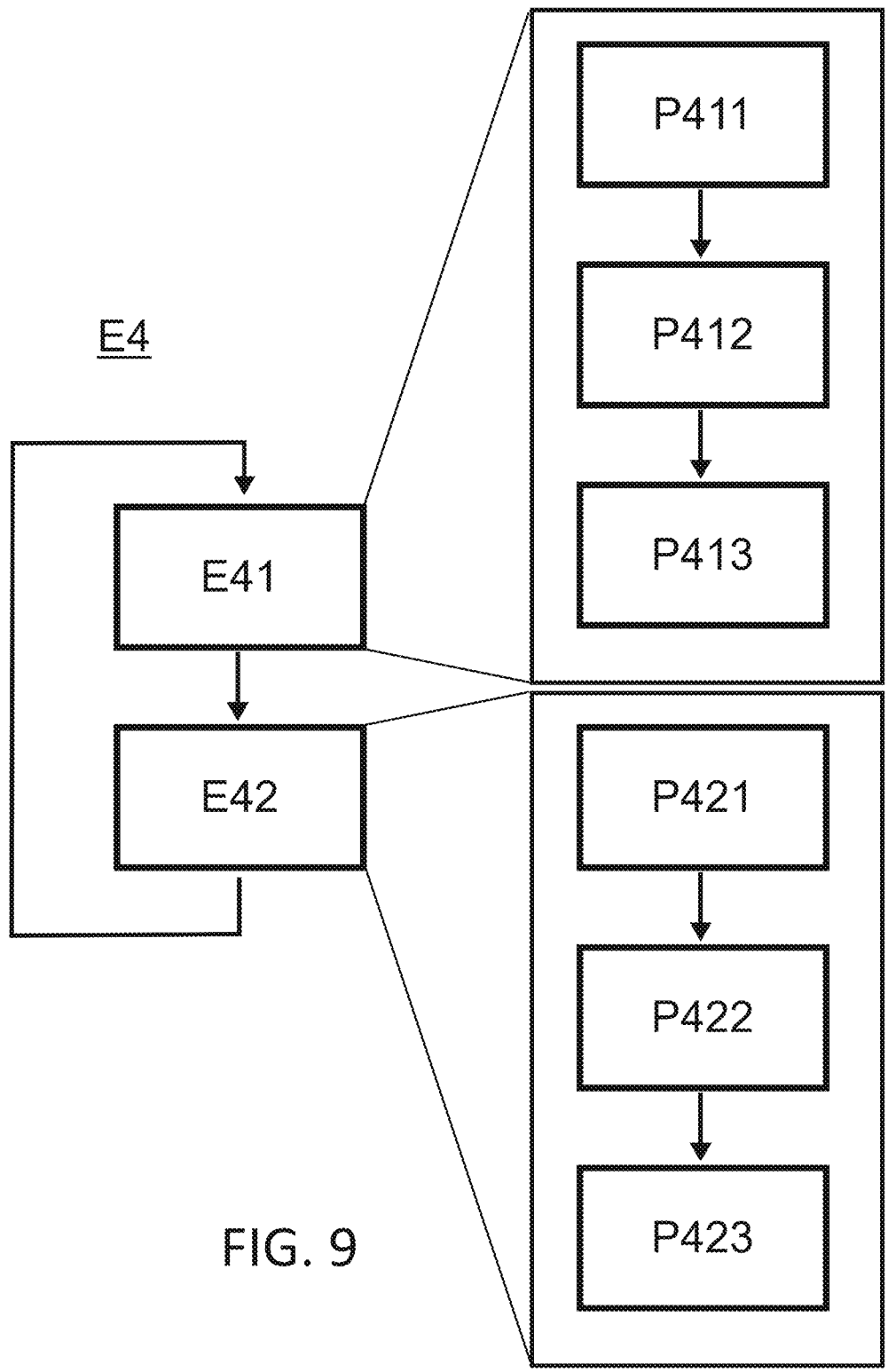
FIG. 9 shows a flowchart of a step of an embodiment of a method according to a first aspect of the invention.
Figure 10:
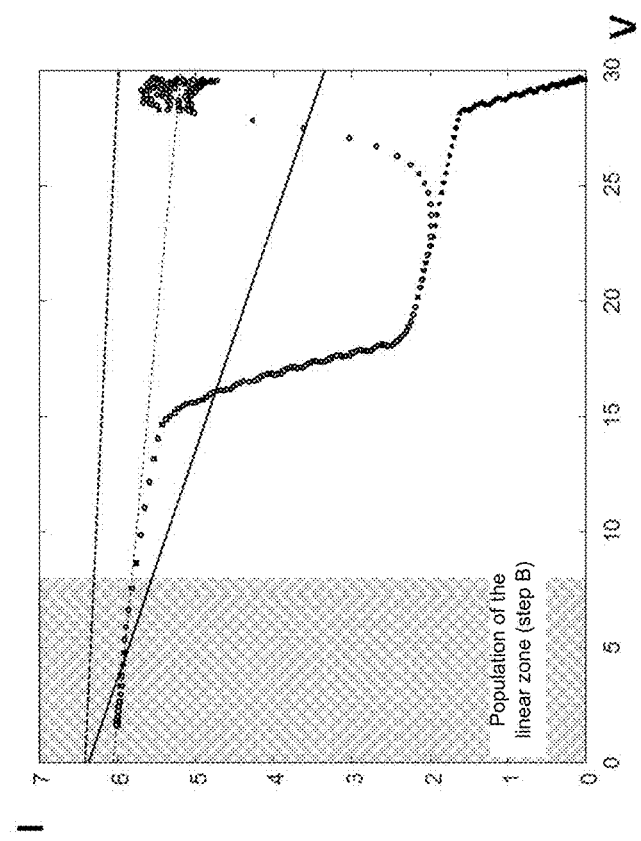
FIG. 10 shows a schematic representation of a compensation for the exponential component of the non-by-pass (on the left) characteristic I(V) and the by-pass (on the right) characteristic I(V).
Figure 10:
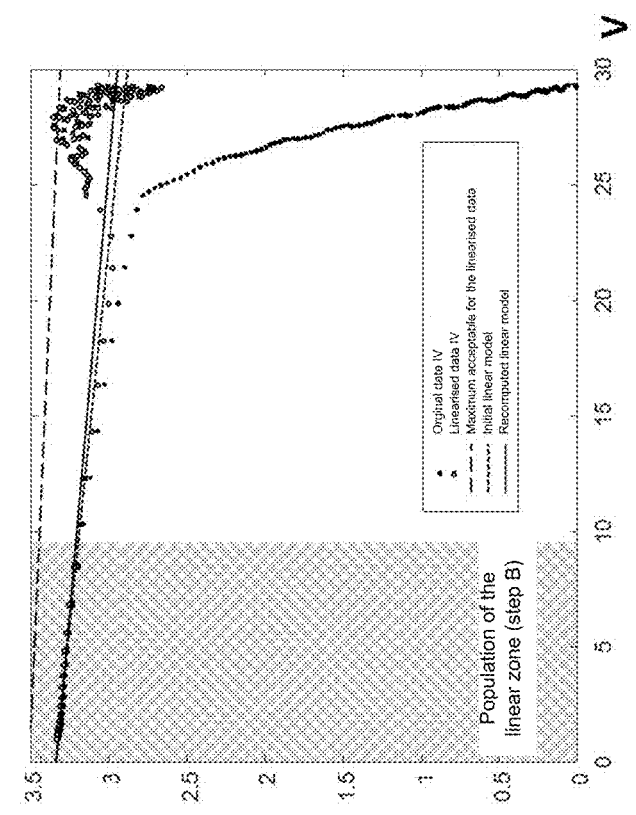

In an embodiment illustrated in FIG. 9, the step E4 of optimising the parameters of the non-by-pass model comprises a first sub-step E41 of optimising the parameters of the linear component of the electrical model. In an embodiment, this sub-step comprises in turn a first phase P411 of determining a linear characteristic by adding $$I_0 \times \left( e^{\frac{W_{th} + R_s \times I}{N}} - 1 \right)$$

to the characteristic $I(V_{ref})$ so as to obtain $I_{linear}(V)$. This addition can be seen as the deformation of the experimental data of the characteristic $I(V_{ref})$ so as to be able to determine the linear component thereof. This compensation is illustrated in FIG. 10 (the graph on the left is relating to a non-by-pass characteristic $I(V_{ref})$ whereas that on the right is relating to a by-pass characteristic $I(V_{ref})$) in which the black points correspond to the measurement of $I(V_{ref})$ whereas the black-encircled white point correspond to the curve $I_{linear}(V)$, that is the curve obtained after compensating for the exponential component. In other words, the linear current $I_{linear}(V)$ can be described as being:

$$I_{linear} = I(V_{ref}) + I_0 \times \left(e^{\frac{V+R_s \times I}{N}} - 1\right)$$

In addition, upon computing $I_{linear}(V)$, $I_{linear}$ is limited to a maximum value $$\frac{2 \times R_p \times 1.05 \times \max(I_{ph}, \max(I(V_{ref}))) - V}{2 \times R_D + R_s}$$

in order to avoid that a wrong estimation of the parameters results in a "boom" in the values. This checking is illustrated in FIG. 10 in which the long-dash curve illustrates this boundary not to be exceeded, the points located above this boundary being thereby brought back at the boundary. It will be noticed that in FIG. 10, the black-encircled white points do not form a straight line as may be expected. This is due to a wrong estimation of the exponential component which will be improved during the different iterations of the sub-steps of step E4 of optimising the parameters of the non-by-pass electrical model.

Once $I_{linear}(V)$ has been determined, the first sub-step E41 of optimising the parameters of the linear component also comprises a second phase P412 of determining a linear regression of the equation $I=a_{sc} \times V + b_{sc}$ from the curve $I_{linear}(V)$ so as to determine a new estimation of the parameters $a_{sc}$ and $b_{sc}$. In FIG. 10, the short-dash straight line shows the initial linear model whereas the solid line curve shows the new linear model corresponding to the new values of the parameters $a_{sc}$ and $b_{sc}$. In addition, during this phase of linear regression, the boundaries in the value of the parameters $a_{sc}$ and $b_{sc}$ shown before are checked again.

Finally, the first sub-step E41 of optimising the parameters of the linear component also comprises a third phase P413 of determining the parameters of the linear component of the model, the latter being computed as follows:

$$R_p = -\frac{1}{a_{ac}} - R_s$$

$$I_{ph} = b_{sc} \times \left(1 - \frac{R_s}{R_p}\right) = -\frac{b_{sc}}{1 + a_{sc} \times R_s}$$

These parameters are determined such that the model actually passes through the point $(0, b_{sc})$ and that the derivative of the curve on this point is compatible with the estimation of the linear component. It relies on the hypothesis that the values of the other parameters of the model are properly estimated.

In an embodiment, the linear regression phase just described is performed by considering the $k'_{sol}$ points determined during the step E2 of detecting the linear zones of the characteristic $I(V)$. In an embodiment, the linear regression phase is performed by considering the $k'_{sol}$ during the first iteration of the first sub-step E41 of optimising the parameters of the linear component, an increasing number of points being considered for the next iterations of the sub-step so as to take into account at first all the points located on the left of the straight line passing through $\{0,0\}$ and $\{I_{MPP}, V_{MPP}\}$ for all the points of the curve $I_{linear}(V)$. The number of points included during each iteration will be for example a function of the total number of iterations. For example, if the total number of iterations is equal to ten, at each iteration, $\frac{1}{10}$ of the points can be introduced to the points already taken into account.

Moreover, the step E4 of optimising the parameters of the non-by-pass electrical model also comprises a sub-step E42 of optimising the parameters of the exponential component of the non-by-pass electrical model. In an embodiment, this sub-step comprises in turn a first phase P421 of determining a characteristic $V_{linear}(I) = V_{ref}(I) - W_{th}(I) + b_{oc} + a_{oc} \times I$ where $a_{oc}$ and $b_{oc}$ refer to the previous estimation of the parameters. As a reminder, the non-by-pass electrical model can be written in the following way:

$$W_{th}(Y) = R_p \times I_{ph} + (R_s + R_p) \times Y - R_p \times I_0 \times \left(e^{\frac{W_{th}+R_s \times Y}{N}} - 1\right).$$

This characteristic $V_{linear}(I)$ corresponds to the values of $V_{ref}(I)$ for which the exponential component is compensated for (and thus should be close to an affine model when the parameters of the model $I(V)$ are properly estimated).

Once $V_{linear}(I)$ has been determined, the sub-step E42 of optimising the parameters of the exponential component also comprises a second phase P422 of determining a linear regression of the equation $W = a_{oc} \times Y + b_{oc}$ from the curve $V_{linear}(I)$ so as to determine a new estimation of the parameters $a_{oc}$ and $b_{oc}$, the cost associated with a point i of the curve $V_{linear}(I)$ being computed using the following formula:

$$\frac{\max(I) - I(i)}{\text{sum}(\max(I) - I(i))}$$

where sum(x) is the sum of all the $x_i$, $x_i$ representing a value that the variable x can take.

In an embodiment, the linear regression phase is performed by considering the $k_{sol}$ points determined during the step E2 of detecting the linear zones of the characteristic $I(V)$. In an embodiment, the linear regression phase is performed by considering the $k_{sol}$ points during the first iteration of the sub-step E42 of optimising the parameters of the exponential component, an increasing number of points being considered for the next iterations of the sub-step so as to take into account at first all the points located on the right of the straight line passing through $\{0,0\}$ and $\{I_{MPP}, V_{MPP}\}$ and then through all the points of the curve $V_{linear}(I)$.

Figure 11:
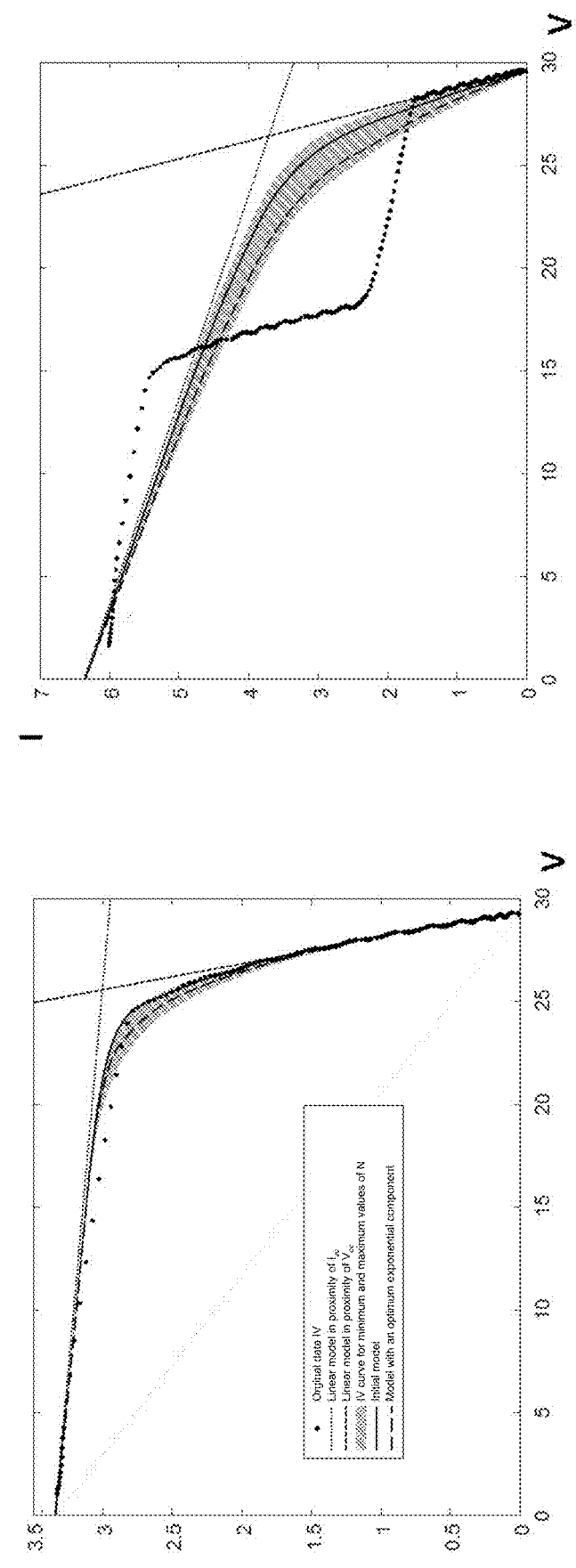
FIG. 11 shows a schematic representation of a determination of the parameters of the exponential component in the case of a non-by-pass (on the left) characteristic Y(W) and by-pass (on the right) characteristic Y(W).

Moreover, as illustrated in FIG. 11, the sub-step E42 of determining the parameters of the exponential component also comprises a third phase P423 of determining the parameters N, $I_0$ and $R_s$. For any value of N noted $\hat{N}$ in the interval $[N^{min}, N^{max}]$, it is possible to compute values $\widetilde{R_s}$ and $\widetilde{I_0}$ such that the model remains close to the linear model in proximity of $V_{oc}$. To that end, the following relationships are imposed:

$$\widetilde{I_0} = \frac{R_p \times I_{ph} - b_{oc}}{R_p \times \left(e^{\frac{b_{oc}}{\hat{N}}} - 1\right)}$$

$$\widetilde{R_s} = -a_{oc} - \frac{\hat{N} \times R_p}{(R_p \times I_{ph} - b_{oc}) + R_p \times \widetilde{I_0} + \hat{N}}.$$

As previously, the maximum values thus determined are sandwiched and possibly corrected to respect the sandwich.

By performing such a computation, it is possible to realise that the models giving $\widehat{W_{th}}$ and associated with the values $\hat{N}$, $\widehat{I_0}$, $\widehat{R_s}$, $I_{ph}$ and $R_p$ mainly differ from each other in that they are smoother when increases and on the contrary tend to move closer to a "tip" curve when $\hat{N}$ decreases corresponding to both linear models described by the constants $a_{sc}$, $b_{sc}$, $a_{oc}$ and $b_{oc}$. It is thus possible to assume that the function $S(\widehat{W_{th}}, V_{ref})$ already introduced and which associates with $\hat{N}$ the proximity between the model corresponding to the value $\hat{N}$ and the data $V_{ref}$ is a convex function. It is thus possible to optimise the value of $\hat{N}$ by relying on the cost function $S(\widehat{W_{th}}, V_{ref})$. The evolution $\widehat{W_{th}}$ for different values of $\hat{N}$ is illustrated in FIG. 11. More particularly, the upper bound of the hatched zone corresponds to the computation of $\widehat{W_{th}}$ with $\hat{N}=N^{min}$ whereas the lower bound of the hatched zone corresponds to the computation of $\widehat{W_{th}}$ with $\hat{N}=N^{max}$. The solid-line curve corresponds to the computation of $\widehat{W_{th}}$ for the initial value of N. The long-dash curve corresponds in turn to the computation of $\widehat{W_{th}}$ enabling the smallest cost function $S(\widehat{W_{th}}, V_{ref})$ to be obtained.

Thus, the value $\hat{N}$ enabling the cost function $S(\widehat{W_{th}}, V_{ref})$ to be minimised is determined, this value corresponding to the value of N searched for. The parameters $R_s$ and $I_0$ can then be determined by using the obtained value N. The optimisation can for example be made using a dichotomy method by choosing for minimum and maximum values of $\hat{N}$ the half and double of the current value of N. Moreover, at each step of the dichotomy computation, the values of $\hat{N}$, $\widehat{I_0}$ and $\widehat{R_s}$ are checked and corrected such that they remain in the previously defined intervals.

It will be appreciated that, during the step E4 of optimising the parameters of the electrical model, the first sub-step E41 of optimising the parameters of the linear component of the electrical model and the sub-step E42 of optimising the parameters of the exponential component of the electrical model are iterated a plurality of times so as to improve the model, the parameters determined during an iteration being used during the next iteration. In other words, the parameters determined during the first sub-step E41 of optimising the parameters of the linear component of the electrical model are used during the sub-step E42 of optimising the parameters of the next exponential component and the parameters determined during the sub-step E42 of optimising the parameters of the exponential component are used during the first sub-step E41 of optimising the parameters of the linear component of the next electrical model (except for the last iteration).

In an embodiment, the number of iterations is equal to a predefined number, for example a number of iterations equal to 30. In an embodiment, alternatively or in addition, the first sub-step E41 of optimising the parameters of the linear component of the electrical model and the sub-step E42 of optimising the parameters of the exponential component of the electrical model are iterated until $|S_{i+1}(\widehat{W_{th}}, V_{ref})-S_i(\widehat{W_{th}}, V_{ref})|<\varepsilon$ where $S_{i+1}(\widehat{W_{th}}, V_{ref})$ is the evaluation of the model at the iteration i with $\varepsilon$ a defined convergence criterion, that is when the model is not substantially improved any longer between two iterations.

At the end of the last iteration of the step E4 of optimising the parameters of the non-by-pass electrical model, a non-by-pass model $W_{th}$ is therefore available. However, when a by-pass is actually present, this model does not enable the voltage V across the string of modules to be taken into account. A by-pass model should thus be determined to choose thereafter the best of both models (the selection criteria will be set out in the following).

Determining the Parameters of the By-Pass Model

When the string of modules consists of a set of several sub-strings protected by by-pass diodes, it is possible to observe different evolutions on some sub-strings. A typical example of the presence of a by-pass is that of partial shading: a set of sub-strings is lighted at a lesser level than the rest of the string. In this case, according to the voltage set, the sub-string having a lower performance is by-passed in order to avoid that it is placed in a position for consuming the energy produced by the rest of the string. An inflection in the curve I(V) is thereby noticed, the position of this inflection (on the axis of the voltage) informing about the "by-passed" sub-string proportion and the height (on the axis of the current) informing about the loss level associated with respect to the rest of the string. In the following, it will be considered that there cannot be more than two sub-strings. Another choice leads to a combinatory number of cases with the number of by-pass diodes of the string. In practice, it is noticed that the results in case of more than two sub-strings remain generally proper: the main inflection is actually detected and localised; the other inflections being thereby ignored. In other words, the assumption of two sub-strings is made in a computational purpose but does not prevent a method according to a first aspect of the invention from being used in the event that more than two sub-strings are considered.

Figure 12:
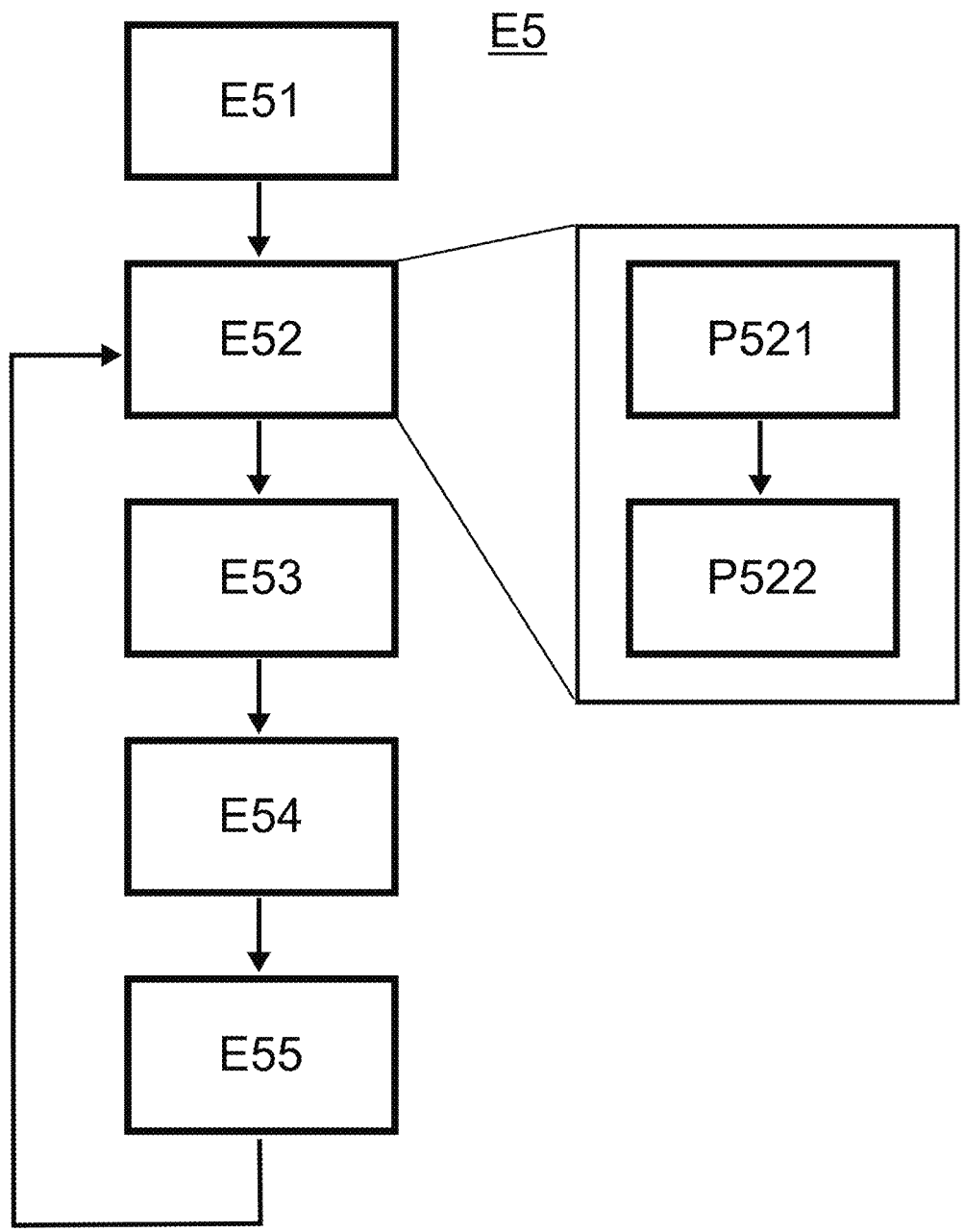
FIG. 12 shows a flowchart of a step of an embodiment of a method according to a first aspect of the invention.

In order to take this aspect of the measurement into account and as illustrated in FIG. 12, the method according to a first aspect of the invention comprises a step E5 of determining the parameters of the by-pass electrical model from the characteristic I(V).

Figure 13:
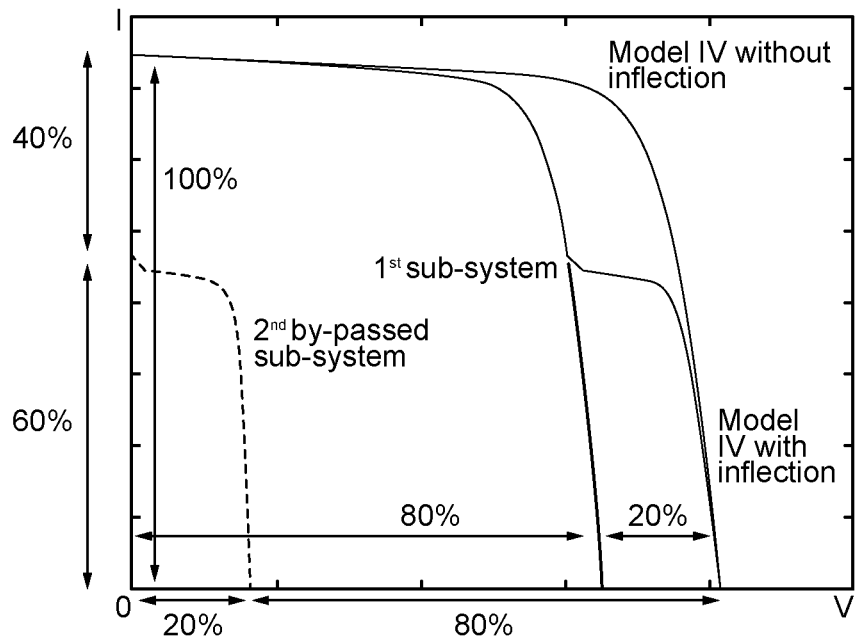
FIG. 13 shows a schematic representation of a determination of the parameters of the by-pass effect.

In order to characterise the deformation of the curve I(V) induced by the by-pass effect, the step E5 of determining the parameters of the by-pass electrical model comprises a first sub-step E51 of initialising the parameters $P_d$ which represents proportion of the by-pass diode (and thus the proportion of sub-strings) which are potentially by-passed (equal to 20% in FIG. 13), from the position of the inflection on the axis representing V; and the parameter $P_I$ representing the short-circuit current loss induced on the first string (equal to 40% in FIG. 13) from the position of the inflection on the axis representing I. Thus, as illustrated in FIG. 13, the inflection of the curve I(V) can be characterised by these two parameters.

From both parameters, it is possible to determine a model by using the parameters determined during the step E4 of optimising the parameters of the non-by-pass electrical model from a reference characteristic $I(V_{ref})$ equal to $I(V)$ or the parameters determined during the sub-step E55 of optimising the non-by-pass model from a reference characteristic $I(V_{ref})$ equal to $I(V_{unshaded})$ (sub-step which will be described in the following). To that end, the step E5 of determining the parameters of the by-pass electrical model comprises a second sub-step E52 of computing the characteristic $W_{mod}(I)$ of the by-pass model. This sub-step E52 includes a first phase P521 of computing the characteristic V(I) of the first sub-string noted $V_1(I)$, the latter being given by:

$$W_1(Y)=(1-P_d)\times W_{th}(Y).$$

The sub-step E52 of computing the characteristic V(I) of the by-pass model also comprises a second phase P522 of computing the characteristic V(I) of the second sub-string noted $V_2(I)$, the latter being given by:

$$W_2(Y) = P_d \times W_{th}\left(\frac{Y}{1 - P_I}\right).$$

The by-pass model, noted $W_{mod}(I)$ is obtained by adding both contributions described above:

$W_{mod}(Y) = W_1(Y) + W_2(Y)$.

It is useful to note that the model $W_{th}(Y)$ corresponding to the non-by-pass model is supposed to be correct during this step.

The step E5 of determining the parameters of the by-pass electrical model then comprises a third sub-step E53 of optimising the parameters of the by-pass model $W_{mod}(Y)$ using the metric $S(W_{mod}, V)$ defined before and from the characteristic I(V). This optimisation can for example be performed by a gradient descent method such as a simplex method. At the end of this optimisation, the parameters $P_I$ and $P_d$ allowing the best match with the measurements are retained. During this optimisation, fulfilling the boundary values of the parameters $P_I$ and $P_d$ is checked, at each iteration of the dichotomy algorithm.

Figure 14:
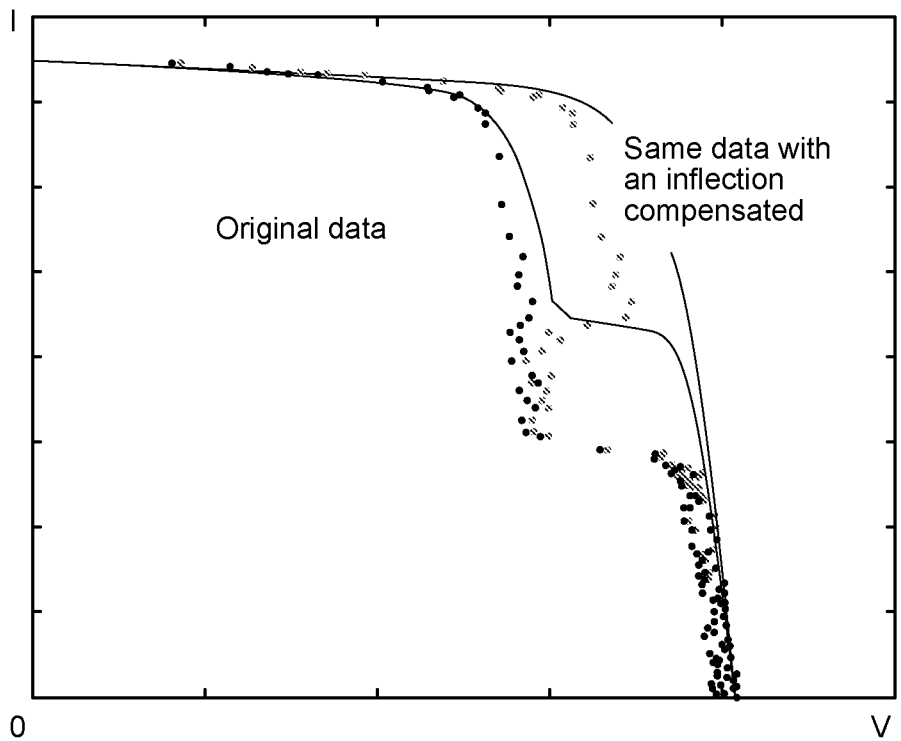
FIG. 14 shows a schematic representation of a compensation for the inflection of the characteristic I(V).

The step E5 of determining the parameters of the by-pass electrical model comprises a fourth sub-step E54 of deforming the curve DM so as to compensate for by-pass. As illustrated in FIG. 14, this deformation can be performed using the parameters $P_I$ and $P_d$ as well as the non-by-pass model by applying a deformation reverse to that induced by by-pass and thus to obtain a characteristic $V_{unshaded}(I)$ as well as the corresponding characteristic $I(V_{unshaded})$. Indeed, from the parameters $P_I$ and $P_d$ and the non-by-pass model, it is possible to estimate the deformation induced on voltages as a function of the current and to apply the reverse deformation on the voltages measured in order to produce an estimation of the points that could be obtained if this deformation were not present.

Accordingly, it is possible to re-evaluate the non-by-pass model by using this new characteristic $I(V_{unshaded})$. To that end, the step E5 of determining the parameters of the by-pass electrical model comprises a sub-step E55 of optimising the non-by-pass model using a reference characteristic $I(V_{ref})$ equal to $I(V_{unshaded})$ newly obtained. The re-evaluation sub-step is thus identical to the step E4 of determining the parameters of the non-by-pass electrical model except that this determination step is made using the characteristic $I(V_{unshaded})$.

It will be appreciated that, the second, third, fourth and fifth sub-steps are iterated a plurality of times so as to obtain a by-pass electrical model from the non-by-pass model re-evaluated and the parameters $P_d$ and $P_I$. It also appears to be obvious from what precedes that the parameters determined during an iteration are used during the next iteration. In an embodiment, the number of iterations is equal to a predefined number, for example a number of iterations equal to 30. In an embodiment, alternatively or in addition, the second, third, fourth and fifth sub-steps of the step E5 of determining the parameters of the by-pass electrical model are iterated until $|S_{i+1}(W_{mod}, V) - S_i(W_{mod}, V)| < \varepsilon$ where $S_i(W_{mod}, V)$ is the evaluation of the by-pass model at the iteration i with $\varepsilon$ a defined convergence criterion, that is when the model is no longer substantially improved between two iterations.

At the end of the step E5 of determining the parameters of the by-pass electrical model, the by-pass model $W_{mod}(Y)$ expressed using the non-by-pass model optimised during the step as well as the parameter $P_d$ and $P_I$ of the by-pass determined and optimised during the step are therefore obtained. The latter should now be compared with the non-by-pass model $W_{th}$ in order to determine the model closest to the experimental data V(I).

Preserving the Best Model

At the end of step E5 of determining the parameters of the by-pass electrical model, two models have been determined: a non-by-pass model $W_{th}(Y)$ and a by-pass model $W_{mod}(Y)$. However, it should be determined, among both models, which one is the most suitable for describing the string of modules measured. As has already been introduced, the deviation between the predictions of a model can be measured using a cost function noted S. The cost function associated with the non-by-pass model is given by $S(W_{th}, V)$ whereas the cost function associated with the by-pass model is given by $S(W_{mod}, V)$.

In an embodiment, the model selected is the model associated with the lowest cost function, that is the predictions of which are closest to the data measured. Thus, if $S(W_{th}, V) \geq S(W_{mod}, V)$ then the non-by-pass model is selected, the by-pass model being selected otherwise.

In some cases, the criterion shown above can lead to the selection of a by-pass model (and relying on a greater number of hypotheses) whereas a non-by-pass model would perfectly suit. In order to avoid this case, in an embodiment when $$S(W_{th}, V) - S(W_{mod}, V) < \frac{S(0, V)}{500}$$

then, the non-by-pass model is selected even if the later has a higher cost function than the by-pass model with the proviso that $P_d$ is within the interval $[P_d^{min}, P_d^{max}]$ and that $P_I$ is within the interval $[P_I^{min}, P_I^{max}]$.

Detecting the Anomalies in the String of Modules

As has been just seen in detail, it is possible to determine, from a characteristic I(V) relating to a string of modules, the electrical model of the module. The value taken by the parameters of the model thus determined carries information, in particular on possible anomalies in the string. A second aspect of the present invention thus proposes a method for detecting an anomaly in a string of photovoltaic modules. The method comprises a first step of determining the electrical model of the string of modules using a method according to a first aspect of the invention. Then, it comprises a step of detecting an anomaly as a function of the value of at least one parameter of the electrical model determined. For example, an anomaly corresponding to an abnormal resistance could be detected when the series resistance estimated (back to the standard temperature and radiation conditions) by the model is higher than twice the mean usual value (for example determined from manufacturer data or prior measurements). In an embodiment, the evolution of the parameters of the model are evaluated at regular intervals so as to observe an evolution in the parameters, an anomaly being detected when the value of at least one parameter moves away from the initial value of the parameter beyond a predefined threshold, for example of more than 10% of the initial value.

Implementation Device

In order to implement the method according to a first aspect or a second aspect of the invention, a third aspect relates to a device comprising the systems and devices necessary to this implementation. In an embodiment, the device comprises a computing unit (e.g. a processor, a FPGA or an ASIC chip) associated with a memory. The memory can contain instructions as well as the variables necessary for running a method according to a first aspect or a second aspect of the invention. In an embodiment, the device also comprises a data acquisition system. In an embodiment, the acquisition system comprises a network connection device (for example a WiFi or Ethernet chip) and/or a bus connection device in order to be able to receive the data necessary to the running of a method according to a first aspect or a second aspect of the invention, and in particular the characteristic I(V). In an embodiment, the device comprises a reading system for reading a data medium (for example a DVD reader) on which the data necessary to the running of a method according to a first aspect or a second aspect of the invention are stored. In one embodiment, the device comprises a device configured to acquire the curve I(V).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for determining an electrical model of a string of photovoltaic modules from a characteristic I-V of said string and a non-by-pass model corresponding to a first operating condition of the string, called a non-by-pass condition, given by the following equation:

$$Y = I_{ph} - \frac{W_{th} + R_s \times Y}{R_p} - I_0 \times \left(e^{\left(\frac{W_{th}+R_s \times Y}{N}\right)} - 1\right)$$

with $I_{ph}$ the photocurrent, $R_s$ the series resistance, $R_p$ the parallel resistance, $I_0$ the dark current of the diode, $$N = \frac{k}{q} \times N_s \times T_{ideal}$$

with $T_{ideal} \in [200, 300]$, $N_s$ the number of series cells in the string, $k_b$ is the Boltzmann's constant and q is the elementary charge of a proton, Y the current passing through the string and $W_{th}$ the voltage across the string, $I_{ph}$, $R_s$, $R_p$, $I_0$ and N being parameters of the non-by-pass model; and a by-pass model corresponding to a second operating condition of the string, called a by-pass condition and given by the following equation:

$$W_{mod}(Y) = W_1(Y) + W_2(Y)$$

with $W_{mod}$ the voltage across the string according to the by-pass model for the current Y, $$W_1(Y) = (1 - P_d) \times W_{th}(Y) \text{ and } W_2(Y) = P_d \times W_{th}\left(\frac{Y}{1 - P_I}\right)$$

where $W_{th}(Y)$ is the voltage across the string given by the non-by-pass model, $P_d$ the by-pass diode proportion and $P_I$ the short-circuit current loss proportion induced by the by-pass, Pa and Pi being parameters of the by-pass model, the method comprising:
- a step of detecting a first linear zone and a second linear zone of the characteristic I-V;
- a step of initialising the parameters of the non-by-pass electrical model from the characteristic I-V;
- a step of optimising the parameters of the non-by-pass electrical model from a reference characteristic $I(V_{ref})$ equal to I(V);
- a step of determining the parameters of the by-pass electrical model, in order to obtain a by-pass electrical model from the characteristic I-V; and
- a step of determining, from the characteristic I-V, a best model from the non-by-pass model and the by-pass model.

2. The method according to claim 1, further comprising, before the step of detecting the linear zones of the characteristic I-V, a step of checking the data of the characteristic I-V.

3. The method according to claim 2, wherein the step of checking the data of the characteristic I-V comprises at least one of both following sub-steps:
- a sub-step of detecting the switching period of the string, the data measured outside the switching period being removed;
- a sub-step of removing the outliers.

4. The method according to claim 1, wherein the step of detecting a first linear zone and a second linear zone of the characteristic I-V comprises:
- a sub-step of determining the maximum power point ($I_{MPP}$, $V_{MPP}$), the points of the characteristic I-V located above the straight line passing through the origin (0,0) and the point ($I_{MPP}$, $V_{MPP}$) being considered as candidates for the first linear zone, and the points located below this straight line being considered as candidates for the second linear zone;
- a sub-step of determining the linear model of the current Y as a function of the voltage W across the string such that $Y = a_{sc} \times W + b_{sc}$ from the candidate points for the first linear zone and the linear model of the voltage W across the string as a function of the current Y such that $W = a_{oc} \times Y + b_{oc}$ from the candidate points for the second linear zone, so as to determine the parameters $a_{sc}$, $b_{sc}$, $a_{oc}$ and $b_{oc}$.

5. The method according to claim 4, wherein during the step of initialising the parameters of the non-by-pass electrical model, the parameters of the electrical model $I_{ph}$, $R_s$, $R_p$, $I_0$ and N are initialised in the following way:

$R_p$ is given by $$R_p = -\frac{1}{a_{sc}};$$

N is given by $$N = \frac{k}{q} \times N_s \times T_{ideal}$$

with $T_{ideal} \in [200, 300]$;

$I_0$ is given by $$I_0 = \frac{R_p \times b_{sc} - b_{oc}}{R_p\left(e^{\frac{b_{oc}}{N}} - 1\right)};$$

$R_s$ is given by $$R_s = -a_{oc} - \frac{N \times R_p}{N + I_0 \times R_p \times e^{\frac{b_{oc}}{N}}};$$

and
$I_{ph}$ is given by $$I_{ph} = \frac{R_p + R_s}{R_p} \times b_{sc} + I_0 \times \left(e^{\frac{R_s \times b_{sc}}{N}} - 1\right).$$

6. The method according to claim 1, wherein the model comprises a linear component and an exponential component and in that the step of optimising the parameters of the non-by-pass electrical model comprises:
- a first sub-step of optimising the parameters of the linear component of the non-by-pass electrical model comprising:
  - a phase of determining a linear characteristic so as to obtain $I_{linear}(V)$;
  - a phase of determining the linear regression of the equation $Y = a_{sc} \times W + b_{sc}$ from the curve $I_{linear}(V)$;
  - a phase of determining the parameters of the linear component of the model from said regression;
- a second sub-step of optimising the parameters of the exponential component of the non-by-pass electrical model comprising:
  - a phase of determining a linear characteristic V-I so as to obtain $V_{linear}(I)$;
  - a phase of determining the linear regression of the equation $W = a_{oc} \times Y + b_{oc}$ from the curve $V_{linear}(I)$;
  - a phase of determining the parameters of the exponential component of the model from said regression;

said first and second sub-steps being iterated a plurality of times so as to obtain a non-by-pass electrical model.

7. The method according to claim 1, wherein the step of determining the parameters of the by-pass electrical model comprises:
   a first sub-step of initialising the first parameter $P_d$ and the second parameter $P_I$ which are characteristic of the by-pass;
   a second sub-step of determining, from the parameters $P_d$ and $P_I$, the characteristic $W_{mod}(Y)$ associated with the by-pass model;
   a third sub-step of optimising the parameters $P_d$ and $P_I$ of the by-pass model $W_{mod}(I)$;
   a fourth sub-step of deforming, from the parameters $P_d$ and $P_I$, the curve $I(V)$ so as to obtain a non-by-pass characteristic $I(V_{unshaded})$;
   a fifth sub-step of optimising the parameters of the non-by-pass electrical model from a reference characteristic $I(V_{ref})$ equal to $I(V_{unshaded})$;
   the second, third, fourth and fifth sub-steps being iterated a plurality of times so as to obtain a by-pass electrical model from the non-by-pass model re-evaluated and the parameters $P_d$ and $P_I$.

8. A method for detecting an anomaly in a string of photovoltaic modules, comprising:
   a step of determining the electrical model of the string of modules using a method according to claim 1;
   a step of detecting an anomaly as a function of the value of at least one parameter of the electrical model determined.

9. A data processing device comprising a system for implementing the method according to claim 1.

10. A non-transitory computer readable medium comprising machine executable instructions which, when the program is run on a computer, cause the computer to implement the method according to claim 1.

* * * * *